0
United States Patent Office 3,484,469
Patented Dec. 16, 1969

3,484,469
PREPARATION OF 1,3,5,7-TETRAMETHYL-1,3,5,7-TETRAPHENYLCYCLOSILOXANE
Paul Alfred Eugene Guinet and Robert Raphael Puthet, Lyon, France, assignors to Rhone-Poulenc S.A., Paris, France, a French body corporate
No Drawing. Filed Jan. 5, 1967, Ser. No. 607,380
Claims priority, application France, Jan. 17, 1966, 46,177
Int. Cl. C07d 109/04
U.S. Cl. 260—448.2     3 Claims

ABSTRACT OF THE DISCLOSURE 1,3,5,7 - tetramethyl - 1,3,5,7 - tetraphenylcyclo - tetrasiloxane is prepared by heating the polymeric hydrolysis product of phenylmethyldichlorosilane in the presence of an alkali metal carbonate and distilling off the 1,3,5,7-tetramethyl-1,3,5,7-tetraphenylcyclotetrasiloxane as it is formed.

---

The present invention relates to the preparation of 1,3,5,7 - tetramethyl - 1,3,5,7 - tetraphenylcyclotetrasiloxane.

This cyclotetrasiloxane is known, and two articles concerning it have been published, one by R. N. Lewis in J. Amer. Chem. Soc. (1948) 70, 1115–1117, and the other by C. W. Young et coll. [same journal (1948) 70, pages 3758–64]. The process described by these authors comprises, as a first step, hydrolysis of methylphenyldichlorosilane, either as such, or in solution in ether. The hydrolysate is then very rapidly distilled in vacuo at elevated temperature so as to separate the volatile products from the high polymers formed. In the course of this operation, according to Lewis, the polymers must be partly depolymerised to form distillable cyclopolysiloxanes. The distillate is then fractionated with an effective distillation column, and cyclic tetramer is obtained in a yield not exceeding 30–35% of the theoretical yield. In addition to this tetramer, 1,3,5-trimethyl-1,3,5-triphenylcyclotrisiloxane may also be isolated, but this trimer is much less interesting than the tetramer, as the trimer is crystalline, so that many precautions must be taken in its purification by distillation in order to avoid incipient crystallisation in the ducts of the apparatus employed, while on the other hand the quantity of the trimer obtained is distinctly smaller than that of the tetramer.

In practice, the cyclic tetramer has appeared to be the more interesting in the organosilicon compound industry, in which it is employed as a basic starting material for various applications, more particularly in the preparation of organopolysiloxane gums. It is therefore desirable to be able to obtain this tetramer in better yields than those mentioned above.

The present invention provides an improved process for the preparation of 1,3,5,7-tetramethyl-1,3,5,7-tetraphenylcyclotetrasiloxane by depolymerisation of the polymers obtained by the hydrolysis of methylphenyldichlorosilane.

Various processes of depolymerisation are already known by which it is possible to convert organopolysiloxane polymers of more or less high molecular weight into cyclic polymers which can readily be distilled under a reduced pressure of a few millimetres of mercury or even under atmospheric pressure. It is also known that these processes may be applied to organopolysiloxanes of various structures, which are either formed exclusively of units of the formula:

(R)$_2$SiO in which the two symbols R, which are identical or different, represent radicals such as alkyl or aryl radicals, or contain also, a certain proportion of units such as (R)$_3$SiO$_{0.5}$, RSiO$_{1.5}$, or SiO$_2$.

For example, in French Patent No. 926,832, a process is described for the preparation of dialkylcyclopolysiloxanes by heating in the absence of oxygen, at elevated temperature, polymers obtained by the hydrolysis of dialkyldichlorosilanes and monoalkyltrichlorosilanes, the depolymerisation being preferably carried out in the presence of a small quantity of an alkali metal hydroxide. United States Patent No. 2,455,999 mentions French Patent No. 926,832 and describes in addition a process for the preparation of alkylarylcyclopolysiloxanes by heating in a closed vessel, at elevated temperature, alkyl-arylpolysiloxanes of high molecular weight, again in the presence of an alkali metal hydroxide as depolymerisation catalyst.

When applied to polymers obtained by the hydrolysis of methylphenyldichlorosilane, however, this process does not give good results. With potassium hydroxide as catalyst, no depolymerisation occurs. On prolonged heating, the Si—C$_6$H$_5$ bonds are broken, and the polymer is degraded and resinified. With sodium hydroxide, depolymerisation takes place, but the tetramer yield is of the same order as that obtained with no catalyst, i.e. between 25% and 35% based on the polymer subjected to pyrolysis.

It has now been found, and this forms the subject of the present invention, that the cyclic tetramer yield is considerably improved if the depolymerisation of the polymers obtained by the hydrolysis of methylphenyldichlorosilane is carried out using an alkali metal carbonate as catalyst. The process of the present invention therefore comprises heating the polymer obtained by hydrolysis of phenylmethyldichlorosilane with, as catalyst, an alkali metal carbonate under reduced pressure with continuous removal by distillation as it is formed of the 1,3,5,7 - tetramethyl - 1,3,5,7 - tetraphenylcyclotetrasiloxane produced by depolymerisation of the said polymer.

The hydrolysis of methylphenyldichlorosilane presents no difficulties and can be effected by the known methods. The methylphenyldichlorosilane is rapidly run into vigorously agitated water so as to maintain the temperature of the mixture at about 70–80° C. The mixture is then allowed to stand, the upper aqueous layer is decanted and the lower layer is dried by any known method. The quantity of water necessary for the hydrolysis is not critical and may be from 1 to 5 times the weight of the methylphenylchlorosilane to be hydrolysed. It is obvious that the hydrolysis may be carried out in various solvents such as diethyl ether, toluene, or xylene, but this procedure is not always practical, because it makes it necessary to handle large volumes of solvents and to recover them by distillation. Therefore, it is generally preferable in practice to hydrolyse the methylphenylchlorosilane undiluted.

The dried lower organopolysiloxane layer is then introduced into a distillation apparatus, for example a glass round-bottomed flask connected to a short column, and the alkali metal carbonate catalyst is added. The mixture is heated under a pressure reduced to several millimetres of mercury (e.g. below 1 cm. Hg) and at a temperature in the mass at or above the boiling point of the desired product at the prevailing pressure, and generally at between 250° and 290° C., so as to distill the products resulting from the depolymerisation as they are produced.

The quantity of alkali metal carbonate employed may vary within fairly wide limits. It may represent from 0.05% to 6% of the weight of polymer treated. Preferably, a proportion of 0.5% to 3% is employed, but the yield of cyclic tetramer is not disadvantageously affected by the use of proportions of carbonate as low as 0.05% and as high as 6%. Particularly suitable alkali carbonates are sodium carbonate, potassium carbonate, double potassium and sodium carbonate and lithium carbonate. Industrial products may be used.

The volatile organopolysiloxanes resulting from the depolymerisation of the crude polymer generally respresent from 80% to 98% by weight of this polymer, the percentage varying somewhat with the catalyst employed. They are carefully fractionated in a distillation apparatus and the cyclic tetramer is obtained in a yield representing 40–70% of the theoretical quantity of cyclic tetramer corresponding to the methylphenyldichlorosilane used as starting material.

Apart from the cyclic tetramer, the cyclic trimer is also obtained in two crystalline forms melting at 99° and 45° C. respectively, corresponding to the two geometrical isomers referred to by Lewis and Young (loc. cit.).

The cyclic tetramer fraction is liquid, but, if left at ambient temperature (20° C.), eventually deposits a few crystals of a cyclic tetramer melting at 99° C. This crystalline tetramer has been mentioned by Young.

1,3,5,7 - tetramethyl - 1,3,5,7 - tetraphenylcyclotetrasiloxane may be employed for the preparation of organosilicon gums, fluids and resins, and in addition may be used in the treatment of filters based upon silica and various metal oxides, such as titanium oxide and alumina. It may also be incorporated as an additive or reactant in more or less polymerised synthetic resins.

The following examples illustrate the invention.

EXAMPLE 1

Hydrolysis of methylphenyldichlorosilane

Into a 10-litre, round-bottom glass flask provided with a stirrer, a dropping funnel, a thermometer tube and a gas delivery tube, connected to a system for the entrainment and neutralisation of the hydrogen chloride formed, are introduced 4950 g. of water, and 1910 g. of methylphenyldichlorosilane (10 mol.) are added thereto through the dropping funnel at a rate such that the temperature does not exceed 75° C. in the reaction mass. When all the chlorosilane has been run in, 2 litres of water are added in one lot and stirring is continued for 15 minutes. The upper aqueous layer is then decanted and eliminated, and the lower polysiloxane layer is treated with 34 g. of sodium carbonate at a temperature of 80–90° C. for 15 minutes. 68 g. of anhydrous sodium sulphate are then added and the product is filtered through filtering earth at elevated temperature (60–70° C.), 1332 g. of a colourless oil are obtained, having the following physical characteristics: viscosity at 20° C., 700 cst.; $n_D^{20}$, 1.5482; $d_4^{20}$, 1.131.

*Depolymerisation.*—The depolymerisation is carried out in a 3-litre, round-bottomed flask on which is mounted a simple column which is in turn connected to a condensing and recovering apparatus, by means of which a crude organopolysiloxane fraction resulting from the depolymerisation and a more volatile fraction formed of water or cracking products can be separately collected.

Into the round-bottom flask 2000 g. of the product prepared as described above and 50 g. of pure anhydrous sodium carbonate are introduced. The flask is heated to a temperature between 250° and 290° C. under reduced pressure (3 mm. Hg), and in 2 hours 10 minutes 1920 g. of a liquid product are obtained, having the following physical characteristics: B.P. 235–245° C./3 mm. Hg; viscosity at 20° C. 195 cst.; $n_D^{20}$, 1.544; and $d_4^{20}$, 1.121. A residue of 83 g. remains in the flask, and 34 g. of a mixture of water and benzene are collected in the volatile product trap.

*Rectification.*—The rectification is carried out in an apparatus comprising a round-bottomed, 3-litre flask, a distillation column provided with knitted metallic elements known under the trade name "Multiknit," a double-jacketed analyser, a double-jacketed separator and a receiver. 1818 g. of the polysiloxane fluid obtained in the preceding step are introduced into the flask, and heated to a temperature in the mass between 250° and 300° C. under reduced pressure (0.35 mm. Hg). Two fractions are collected. The first boils at 150–200° C./0.35 mm. Hg and weighs 478 g. This fraction crystallises in the apparatus, and the analyser and the separator must be supplied with water at 80° C. to prevent solidification. The crystalline product is composed of the two isomers of 1,3,5-trimethyl-1,3,5-triphenylcyclotrisiloxane melting at 45° C. and 99° C. respectively. The second fraction boils at 200–203° C./0.35 mm. Hg and weighs 1234 g. It is liquid at ambient temperature (20° C.), and has the following physical characteristics: viscosity at 20° C., 304 cst.; $n_D^{20}$, 1.5448; and $d_4^{20}$, 1,125. It consists solely of 1,3,5,7 - tetramethyl-1,3,5,7-tetraphenylcyclotetrasiloxane (as determined by the molecular weight and by chromatographic analysis in the gas phase).

106 g. of residue remain, which may be subjected, if desired, to another depolymerization at elevated temperature in the presence of alkali metal carbonate.

The 1234 g. of tetramer represent a yield of 63% based on the theoretical quantity of tetramer corresponding to the amount of methylphenyldichlorosilane used as starting material.

EXAMPLE 2

By the procedure of Example 1, but with different alkali metal carbonates, the methylphenylpolysiloxane obtained as described in Example 1 is depolymerised. The product resulting from the depolymerisation is rectified as described in Example 1. The operating conditions and the results are set out in the following Table I. The tetramer yield is expressed in relation to the theoretical amount of tetramer obtainable from the starting methylphenyldichlorosilane.

TABLE I

| Catalyst | | | | Products obtained | | |
|---|---|---|---|---|---|---|
| | | | | | Cyclic tetramer | |
| Nature | Weight (g.) | Weight of oil to be depolymerised (g.) | Duration of the depolymerisation | Crystallising product (g.) | Weight (g.) | Yield percent |
| Technical sodium carbonate [1] | 20 | 800 | 45 min | 211 | 486 | 61.7 |
| Do.[1] | 64 | 1,280 | 1 hr. 15 min | 286 | 778 | 59.4 |
| Potassium carbonate | 37.5 | 1,500 | 1 hr. 30 min | 358 | 710 | 51 |
| Double Na/K carbonate | 37.5 | 1,500 | 1 hr. 45 min | 403 | 726 | 50.5 |
| Double Na/K carbonate | 37.5 | 1,500 | 1 hr. 45 min | 403 | 726 | 50.5 |
| Lithium carbonate | 20 | 800 | 50 min | 259 | 371 | 46 |

[1] $Na_2CO_3$, 99%; NaCl, 0.5%; $Na_2SO_4$, 0.3%; $H_2O$, 0.2%.

EXAMPLE 3

The procedure of Example 1 is followed, to compare the depolymerisation effected with sodium carbonate and that effected with alkali catalysts such as those employed in the previously known processes. Each test started with 400 g. of methylphenylpolysiloxane taken from a single homogeneous mass of polymer oil prepared as described in Example 1 by hydrolysis of methylphenyldichlorosilane, and each catalyst was used in the indicated propor-

TABLE II

| Catalyst | | | Depolymerisation | | Products collected | | | | | Tetramer yield, percent |
|---|---|---|---|---|---|---|---|---|---|---|
| Nature | Weight | Percent | Temp. (°C.) | Duration | Weight (g.) | Boiling Point | $n_D^{20}$ | $d_4^{20}$ | Viscosity at 20° C. (cst.) | |
| Sodium carbonate | 0.4 | 0.1 | 273–300 | 20 min | 90 / 250 | B.p.=160°–215° C./0.5 mm.Hg.. Cryst. / B.p.=215°–218° C./0.5 mm. Hg.. | 1.5452 | 1,125 | 296 | 62.8 |
| Potassium hydroxide | 0.4 | 0.1 | 281–350 | 1 hr | 155 | B.p.=200°–240° C./4 mm. Hg | 1.5698 | 1.080 | 69 | (2) |
| Potassium silanolate [1] | 0.4 | 0.1 | 290–340 | 45 min | 260 | B.p.=230°–245° C./4 mm. Hg | 1.5575 | 1.105 | 140 | (3) |
| Sodium hydroxide | 0.4 | 0.1 | 290–330 | 40 min | 95 / 136 | B.p.=160°–180° C./0.15 mm. Hg. Cryst. / B.p.=180°–185° C./0.15 mm. Hg. | 1.5425 | 1.120 | 132 | 34.6 |

[1] The silanolate was obtained by heating a siloxane of the mean formula $(CH_3)_3Si/OSi(CH_3)_2/_4OSi(CH_3)_3$ with potassium hydroxide, the water formed being eliminated. It contains 10.2% by weight of potassium.
[2] No trimer and no tetramer is isolated.
[3] This fraction contains neither trimer nor tetramer.

tion. The results set out in the above Table II, in which the operating conditions are also indicated, are obtained.

We claim:

1. Process for the preparation of 1,3,5,7-tetramethyl-1,3,5,7-tetraphenylcyclotetrasiloxane which comprises heating under reduced pressure and in the presence of, as catalyst, an alkali metal carbonate, the polymer obtained by hydrolysis of phenylmethyldichlorosilane, the 1,3,5,7-tetramethyl-1,3,5,7 - tetraphenylcyclotetrasiloxane, produced by depolymerisation of the said polymer being removed by distillation as it is formed.

2. Process according to claim 1, in which the catalyst is sodium, potassium, or lithium carbonate.

3. Process according to claim 1, in which the proportion of catalyst is 0.05 to 6% by weight of the said polymer.

References Cited

UNITED STATES PATENTS 2,849,473  8/1958  Bailey et al.
2,979,519  4/1961  Pierce et al.
3,337,497  8/1967  Bostick _____ 260—448.2 X TOBIAS E. LEVOW, Primary Examiner P. F. SHAVER, Assistant Examiner